(12) United States Patent
Zhang

(10) Patent No.: US 11,095,443 B1
(45) Date of Patent: Aug. 17, 2021

(54) PROOF-OF-WORK BASED ON RUNTIME COMPILATION

(71) Applicant: Shape Security, Inc., Santa Clara, CA (US)

(72) Inventor: Bei Zhang, Mountain View, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 127 days.

(21) Appl. No.: 16/653,951

(22) Filed: Oct. 15, 2019

Related U.S. Application Data

(60) Provisional application No. 62/914,103, filed on Oct. 11, 2019.

(51) Int. Cl.
| | |
|---|---|
| *H04L 9/08* | (2006.01) |
| *G06F 9/44* | (2018.01) |
| *G06F 8/41* | (2018.01) |
| *G06F 9/445* | (2018.01) |

(52) U.S. Cl.
CPC .............. *H04L 9/0877* (2013.01); *G06F 8/45* (2013.01); *G06F 9/44589* (2013.01); *H04L 9/083* (2013.01)

(58) Field of Classification Search
None
See application file for complete search history.

(56) References Cited

U.S. PATENT DOCUMENTS

| | | | | |
|---|---|---|---|---|
| 9,430,655 | B1 * | 8/2016 | Stockton | H04L 9/3066 |
| 10,055,591 | B1 * | 8/2018 | Sharifi Mehr | G06F 21/31 |
| 10,592,703 | B1 * | 3/2020 | Ovadia | G06F 30/3312 |
| 2010/0223534 | A1 * | 9/2010 | Earnshaw | H03M 13/1505 |
| | | | | 714/780 |
| 2016/0285833 | A1 * | 9/2016 | Geagan, III | H04L 9/14 |
| 2018/0183601 | A1 * | 6/2018 | Campagna | H04L 63/1441 |
| 2018/0188971 | A1 * | 7/2018 | Palangappa | G06F 3/0679 |
| 2018/0198818 | A1 * | 7/2018 | Andrews | H04L 67/12 |
| 2019/0073481 | A1 * | 3/2019 | Angelino | G06F 8/65 |
| 2019/0333033 | A1 * | 10/2019 | Finlow-Bates | H04L 63/10 |
| 2019/0394175 | A1 * | 12/2019 | Zhang | G06Q 20/401 |
| 2020/0012527 | A1 * | 1/2020 | Hartsock | H04L 9/0894 |
| 2021/0035095 | A1 * | 2/2021 | Wei | G06Q 30/0185 |
| 2021/0051031 | A1 * | 2/2021 | Zamani | H04L 9/3218 |

\* cited by examiner

*Primary Examiner* — Philip Wang
(74) *Attorney, Agent, or Firm* — Troutman Pepper Hamilton Sanders LLP (Rochester)

(57) ABSTRACT

Techniques are provided for proof-of-work based on runtime compilation. Key generation code is partitioned into a set of code blocks. The key generation code generates an expected key value when compiled and executed. A shuffled set of code blocks is generated by reordering the set of code blocks. A client computing device is provided the shuffled set of code blocks and problem-solving code that, when executed at the client computing device, reconstructs the key generation code to generate a submission value by performing one or more compiling iterations. Each compiling iteration comprising reordering the shuffled set of code blocks to generate test code, and attempting to compile and execute the test code to generate the submission value. It is determined that the client computing device fully executed the problem-solving code based on the verifying the submission value.

20 Claims, 6 Drawing Sheets

$\sigma = (5\ 4\ 3\ 2\ 1)$ $\sigma^0 = \sigma^5$    $\sigma^1$    $\sigma^2$    $\sigma^3$    $\sigma^4 = \sigma^{-1}$ $\sigma^1 = (5\ 4\ 3\ 2\ 1)$ $\sigma^2 = (5\ 3\ 1\ 4\ 2)$ $\sigma^3 = (5\ 2\ 4\ 1\ 3)$ $\sigma^{-1} = \sigma^4 = (5\ 1\ 2\ 3\ 4)$ $\sigma^0 = \sigma^5 = (5)(4)(3)(2)(1)$

PROOF-OF-WORK BASED ON RUNTIME COMPILATION

CROSS-REFERENCE TO RELATED APPLICATIONS; BENEFIT CLAIM

This application claims the benefit of Provisional Application Ser. No. 62/914,103, filed Oct. 11, 2019, the entire contents of which are hereby incorporated by reference as if fully set forth herein, under 35 U.S.C. § 119(e).

FIELD OF THE DISCLOSURE

The present disclosure generally relates to security techniques applicable to client/server systems, and relates more specifically to proof-of-work based on runtime compilation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Attackers use autonomous software, also known as bots, to commit many types of unauthorized acts, such as web site or content scraping, ratings manipulation, fake account creation, reserving rival goods attacks, ballot stuffing attacks, password snooping, vulnerability assessments, brute force attacks, click fraud, denial-of-service (DoS) attacks, bidding wars, and system fingerprinting attacks. For example, attackers may place malware, or malicious software, on client computing devices (e.g. smartphones, tablets, laptops, and/or desktops) owned by law-abiding people.

In a DoS attack, a large number of computers under control of an attacker work in coordination to submit a large number of requests in a short period of time to overload a server system, making the server system unavailable to respond to legitimate requests. As another example, when a server system makes a limited quantity of items available for sale, the server system may be flooded with a large number of requests by automated software. The server system may become unable to handle requests, including legitimate requests initiated by a human user.

The burden of defending an attack can thus be disproportionate relative to the effort expended by each client device that participates in the attack. Submitting a request is a computationally inexpensive action for a client device. On the other hand, processing a large number of requests can be computationally expensive for a server system. Furthermore, an attacker may submit requests that trigger server processes that consume a large amount of computational resources. The server system becomes unable to handle legitimate request because the attack occupies bandwidth, computation, or other server system resources.

Attacks that involve multiple requests can be mitigated by slowing down individual attacks. For example, proof-of-work systems require clients to solve a problem that requires a large amount of computation in order to submit a request to a server system. A proof-of-work system can greatly reduce the rate an attacker can submit requests that will be processed by a server system, slowing down malicious activity and potentially preventing malicious activity from overwhelming the server system.

Proof-of-work systems are meant to deter denial-of-service attacks and other abuses. However, traditional proof-of-work systems can be circumvented by using more computational power and/or specialized hardware. For example, specialized hardware, such as application-specific integrated circuits (ASICs), can solve proof-of-work problems much more quickly than typical computers used by legitimate users. Furthermore, multiple computers can be used in parallel to solve a traditional proof-of-work problem more quickly.

SUMMARY

The appended claims may serve as a summary of the invention.

Figure 1:
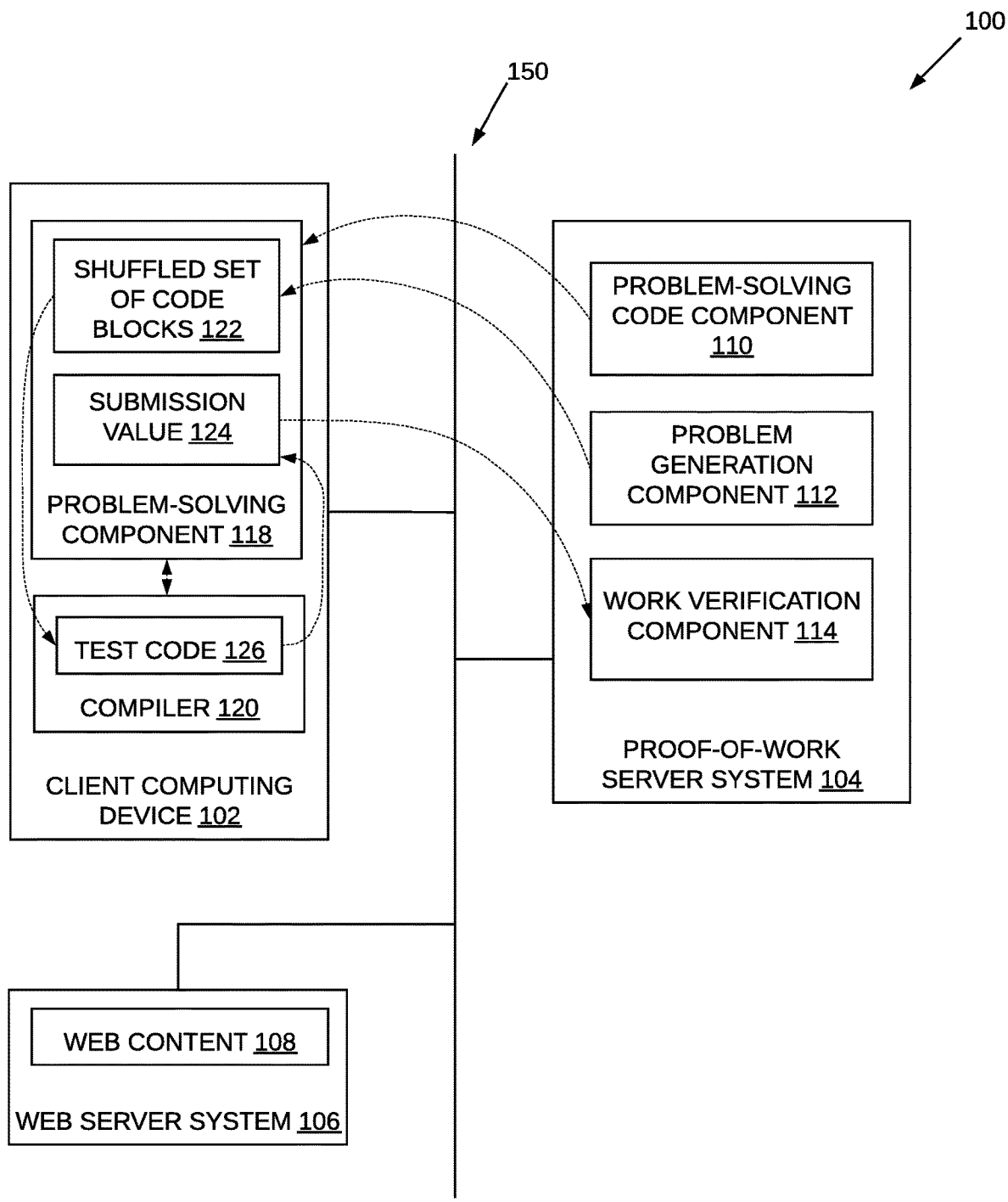
FIG. 1 illustrates a computer system that includes a proof-of-work server system in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", "particular", and the like are used as naming conventions to distinguish elements from each other and does not imply an ordering, timing, or any other characteristic of the referenced items unless otherwise specified; the terms "such as", "e.g.", "for example", and the like describe one or more examples, but do not limit the disclosure to the described example/s; the terms "comprise", "comprises", and "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers (also referred to as a "client computing device").

A "server" (also referred to as "server system") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers (also referred to as a "server computer system"). A server may include multiple servers; that is, a server may include a first server and a second server, which may provide the same or different functionality to the same or different set of clients.

General Overview

This document generally describes systems, methods, devices, and other techniques for proof-of-work based on runtime compilation. A server system generates a proof-of-work problem, assigns the proof-of-work problem to a client computing device, and verifies that the problem is completed by the client computing device. To generate the proof-of-work problem, the server system partitions key generation code into a set of code blocks. When the key generation code is compiled and executed, an expected key value is generated. The expected key value is the solution to the proof-of-work problem. The server system reorders the set of code blocks to generate a shuffled set of code blocks. The server system provides the shuffled set of code blocks to a client computing device as a proof-of-work problem.

To solve the proof-of-work problem, the client computing device must correctly order the shuffled set of code blocks to the original order of the key generation code in order to obtain the solution to the proof-of-work problem. To find the correct order of the shuffled set of code blocks, the client computing device performs compiling iterations. In each compiling iteration, the client computing device reorders the shuffled set of code blocks to generate test code, and attempts to compile and execute the test code. When the order of the shuffled set of code blocks is correct, the test code will compile and generate a valid key value. When the tested order of the shuffled set of code blocks is incorrect, the test code may fail to compile, fail to execute, encounter an error, fail to generate a value, and/or generate a value outside of a range of possible solutions to the proof-of-work problem.

In some embodiments, the proof-of-work problem also includes a reordering function for reordering the shuffled set of code blocks. For example, the shuffled set of code blocks may require the reordering function to be applied t times to generate the correct order, where t is a positive integer. The client computing device is unaware of the value of t. In order to generate the valid key value, the client computing device must use the reordering function to generate test code and attempt to compile and execute the test code corresponding to each reordering until a valid key value is generated after t compiling iterations.

When a compiling iteration successfully generates a valid key value, the client computing device submits a submission value as proof that the computing device performed the required work. The submission value may be the valid key value or t, or may be a value generated based on the valid key value or t. The server system verifies the submission value based on the expected key value. When the submission value is correct, the server system determines that the client computing device has performed the required work and performs a positive action based on the determination. For example, the server system may allow a request from the client computing device to proceed.

On the server side, generating a proof-of-work problem and verifying a submission value are not computationally expensive tasks and can be computed in Big O(1), which is constant time. In contrast, on the client side, iteratively solving a proof-of-work challenge can be performed in Big O(t) time, which computationally expensive relative to generating a proof-of-work problem or verifying a submission value. In addition, this particular proof-of-work method may give attackers with more computational power and/or specialized hardware a negligible advantage over legitimate users.

In some implementations, the various techniques described herein may achieve one or more of the following advantages: an entity that provides a web server system for clients may better protect its users and itself from fraudsters; the protection may be provided relatively simply for the entity in certain implementations without substantial change to in its own code; in some implementations, such security can be added with minimal modification of hardware or software on its own server systems; the protection can be provided flexibly by a security organization that specializes in web security, which can in turn keep a security system updated to address ever-changing security threats; such a security organization can also aggregate security data received across many clients that interact with many domains, and can use that aggregated security data to generate countermeasures that are more effective than countermeasures that could be developed using only data from a single domain. Additional features and advantages are apparent from the specification and the drawings.

System Overview

FIG. 1 illustrates a computer system that includes a proof-of-work server system in an example embodiment. The computer system 100 includes a client computing device 102, a proof-of-work server system 104, and a web server system 106. The client computing device 102, the proof-of-work server system 104, and the web server system 106 communicate over a network 150. The network 150 may include one or more local area networks (LANs) and/or one or more wide area networks, such as the Internet.

The proof-of-work server system 104 implements a proof-of-work system based on runtime compilation at the client computing device 102. The proof-of-work server system 104 includes a problem-solving code component 110, a problem generation component 112, and a work verification component 114. The problem-solving code component 110 generates code that, when executed on the client computing device 102, causes the client computing device 102 to solve a proof-of-work problem that is generated by the problem generation component 114.

The problem generation component 112 generates a proof-of-work problem from key generation code that, when executed, generates an expected key value. The expected key value is the solution to the proof-of-work problem. The problem generation component 112 partitions the key generation code into set of code blocks, and reorders the set of code blocks to generate a shuffled set of code blocks 122. The proof-of-work problem includes the shuffled set of code blocks 122. The proof-of-work server system 104 provides the proof-of-work problem, including the shuffled set of code blocks 122, to the client computing device 102. The proof-of-work server system 104 may provide the proof-of-work problem to the client computing device 102 in a communication directed to the client computing device 102, or in a communication directed to another computer system that forwards the proof-of-work problem to the client computing device 102.

At the client computing device 102, the problem-solving component 118 operates when the client computing device 102 executes problem-solving code from the proof-of-work server system 104 (e.g. from the problem-solving code component 110). In order to solve the proof-of-work problem, the problem-solving component 118 must arrange the shuffled set of code blocks 122 in the original order corresponding to the original key generation code, and execute the resulting code to generate a submission value 124. In each compiling iteration, the problem-solving component 118 reorders the shuffled set of code blocks 122 to generate test code 126, and attempts to compile and execute the test code 126 using the compiler 120. When the problem-solving component 118 has correctly ordered the shuffled set of code blocks 122 in the original order of the key generation code, the corresponding test code 126 will compile and generate a valid key value. When the tested order of the shuffled set of code blocks 122 is incorrect, the test code 126 may fail to compile, fail to execute, encounter an error, fail to generate a value, or generate a value outside of a range of possible key values. The problem-solving component 118 will continue to search for a valid key value until one is generated during a compiling iteration. The proof-of-work problem is solved when the valid key value is successfully generated. When a compiling iteration successfully generates a valid key value, the client computing device 102 submits a submission value 124 based on the valid key value as proof that the client computing device 102 performed the work assigned by the proof-of-work server system 104. The submission value 124 may be the valid key value, or may be a value generated based on the valid key value. For example, the client computing device 102 may apply a function to the valid key value to generate the submission value 124.

In some embodiments, the proof-of-work server system 104 generates a secret-based message authentication code (MAC) based on the expected key value and/or the expected submission value, referred to herein as an expected MAC. The proof-of-work server system 104 generates the expected MAC using a MAC function, such as but not limited to a hash-based message authentication code (HMAC) function. The secret used by the MAC function is a secret that is only known by the proof-of-work server system 104. The proof-of-work server system 104 may send the expected MAC to the client computing device 102 and receive the expected MAC from the client computing device 102 along with the submission value 124. When the proof-of-work server system 104 receives the submission value 124, the proof-of-work server system 104 may apply the secret-based MAC function to the submission value 124 and compare the resulting MAC to the expected MAC. If the expected MAC matches the MAC generated based on the submission value 124, the proof-of-work server system 104 may perform the positive action. Otherwise, the proof-of-work server system 104 may perform a negative action. The work verification component 114 verifies the key submission value 124 based on the expected key value. For example, when the submission value 124 is the valid key value generated by the client computing device 102, the work verification component 114 may compare the submission value 124 to the expected key value generated by the key generation code corresponding to the proof-of-work problem to determine whether the key submission value 124 matches the expected key value. As another example, when the client computing device 102 applies a function to the valid key value to generate the submission value 124, the work verification component 114 may apply the same function to the expected key value and compare the result to the key submission value. Alternatively and/or in addition, the work verification component 114 may apply one or more functions to the submission value 124. The submission value 124 is considered correct when the submission value 124 matches the expected key value, or when the underlying key value used to generate the submission value 124 matches the expected key value.

When the submission value 124 is correct, the proof-of-work server system 104 allows a request from the client computing device 102 to proceed. For example, in response to receiving a request from the client computing device 102, the proof-of-work server system 104 may assign a proof-of-work problem to the client computing device 102 and require the client computing device 102 to submit a correct submission value 124 before processing the request. In some embodiments, the proof-of-work system 104 is implemented to protect a system in other ways, such as to confirm transactions, rate-limit transactions or other processes, allocate limited resources, provide security for financial transactions or data, provide security for identity-based transactions or data, or any other case where a proof-of-work system is desirable.

The proof-of-work server system 104 and/or its components (e.g. problem-solving code component 110, problem generation component 112, and/or work verification component 114) are presented herein as individual components for ease of explanation; any action performed by one or more components of the proof-of-work server system 104 may be considered performed by the proof-of-work server system 104. The proof-of-work server system 104 and/or its components may be implemented as one or more dependent or independent processes, and may be implemented on one or multiple computers. For example, one or more components may be implemented as a distributed system. Alternatively and/or in addition, multiple instances of one or more components may be implemented. Furthermore, a component may be implemented fully and/or partially in one or more programs or processes, and two or more components shown may be implemented fully and/or partially in one program and/or process.

In some embodiments, the proof-of-work server system 104 performs additional server functions and uses the proof-of-work techniques described herein to avoid attacks on the additional server functions. For example, the proof-of-work server system 104 may also act as a web server that provides web content to the client computing device 102 while using the proof-of-work techniques described herein to prevent attacks on the web server. The additional server functions and the proof-of-work techniques may execute within the proof-of-work server system 104 as a single server program or as multiple server programs that interact with each other. In a computer system with one or more computers, the proof-of-work server system 104 may operate on the same computers, an overlapping set of computers, or on different computers as another protected server system operating in the computer system.

In some embodiments, the proof-of-work server system 104 protects another computer system that is connected to the proof-of-work server system 104 and the client computing device 102 over the network 150, which may include one or more wide area networks and/or local area networks. For example, the proof-of-work server system 104 may protect a web server system 106 when a client computing device 102 interacts with the web server system 106 over the network 150. Example 1, presented in greater detail hereinafter, describes embodiments where the proof-of-work server system 104 provides a proof-of-work problem to a client computing device 102 when the client computing device 102 submits a request to a web server system 106 or otherwise interacts with the web server system 106.

Partitioning Key Generation Code

Figure 2:
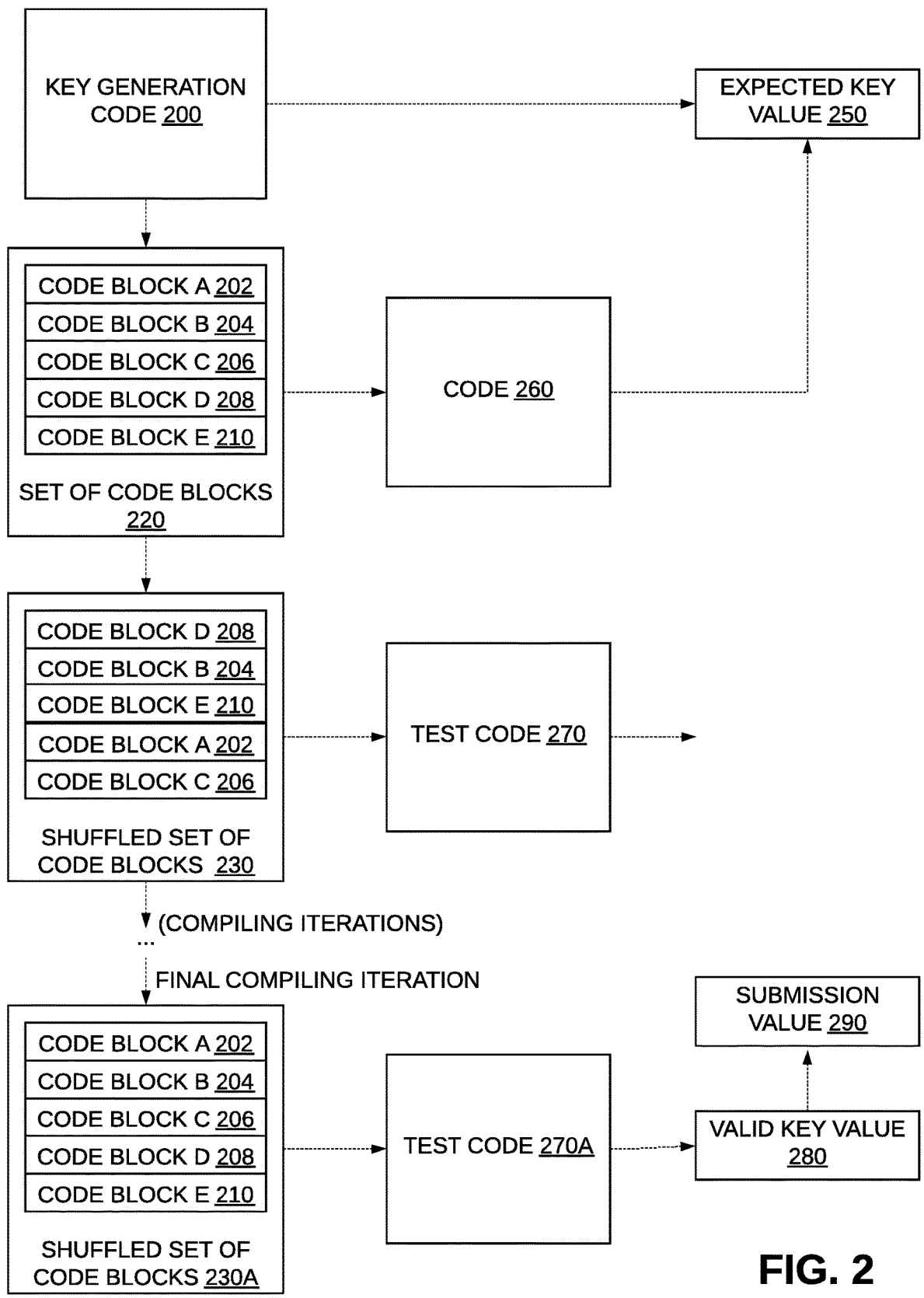
FIG. 2 illustrates intermediate data in generating a proof-of-work problem from key generation code in an example embodiment.

FIG. 2 illustrates intermediate data in generating a proof-of-work problem from key generation code in an example embodiment. FIG. 2 is described with respect to the computer system 100 shown in FIG. 1, including the proof-of-work server system 104, client computing device 102 and web server system 106, but is not limited to performance by these devices and/or systems. The proof-of-work server system 104 generates a proof-of-work problem based on key generation code 200. When the key generation code 200 is compiled and executed, the key generation code 200 outputs or otherwise generates an expected key value 250. The expected key value 250 is the solution to the corresponding proof-of-work problem generated using the key generation code 200.

Different proof-of-work problems may be generated using different key generation code. For example, the proof-of-work server system 104 may use new key generation code for each proof-of-work problem. Alternatively and/or in addition, one or more versions of key generation code may be reused for one or more proof-of-work problems. In some embodiments, the proof-of-work server system 104 generates the key generation code 200. For example, the proof-of-work server system 104 may generate the key generation code 200 based on instructions, rules, templates, or other methods.

The proof-of-work server system 104 partitions the key generation code 200 into set of code blocks 220. To partition the key generation code 200, the proof-of-work server system 104 selects a set of locations in the code at which to divide the key generation code 200, also referred to herein as "split points." The proof-of-work server system 104 divides the key generation code 200 at the set of split points to generate the set of code blocks 220. In the example shown, the key generation code 200 is divided at four split points, forming five code blocks. The resulting set of code blocks 220 includes code block A (202), code block B (204), code block C (206), code block D (208), and code block E (210). In some embodiments, the split points may be automatically detected in the key generation code 200, manually selected, and/or programmatically determined by software that generates the key generation code 200. For example, the instructions, rules, templates, or other methods for generating the key generation code 200 may indicate one or more split point locations in the key generation code 200.

The code blocks 202-210 can be combined in the original order after partitioning to generate code 260 that is equivalent to the key generation code 200. When compiled and executed, the code 260 generated from set of correctly-ordered code blocks 220 will output or otherwise generate the expected key value 250, which is the same outcome as when the key generation code 200 is compiled and executed.

The proof-of-work server system 104 may partition the key generation code based on particular rules or heuristics. For example, the proof-of-work server system 104 may create a certain size of code blocks 202-210, create a certain number of code blocks 202-210, impart randomness in creating code blocks 202-210, or apply other rules or heuristics. In some embodiments, partitioning the key generation code is performed using rules or heuristics that prevent an attacker from circumventing the work assigned to the client computing device 102. For example, an attacker may attempt to assemble the code blocks 202-210 without performing the compiling iterations. Without limiting the techniques described herein, Example 2 describes various methods for partitioning the key generation code 200 to prevent circumvention of work in greater detail hereinafter.

Shuffling the Set of Code Blocks

The proof-of-work server system 104 generates the shuffled set of code blocks 230 by reordering the code blocks 202-210 in the set of code blocks 220. For example, the original ordering of code blocks in the set of code blocks 220 is [A, B, C, D, E], or [202, 204, 206, 208, 210], and the new ordering of code blocks in the shuffled set of code blocks 230 is [D, B, E, A, C], or [208, 204, 210, 202, 206].

The proof-of-work server system 104 may reorder the code blocks 202-210 using any technique that reorders a plurality of items. For example, the proof-of-work server system 104 may randomly reorder the code blocks 202-210 to generate the shuffled set of code blocks 230. When the reordering is random, problem-solving code at the client computing device 102 can randomly search for the correct order of the code blocks 202-210 that will generate a submission value 290 to submit as the answer to the proof-of-work problem. In the case of random reordering, the work required to solve the proof-of-work problem will vary greatly, and has the potential to be extremely low or unacceptably large, potentially causing significant delays for a legitimate user.

The proof-of-work server system 104 may reorder the code blocks 202-210 using more systematic reordering techniques. For example, the ordering technique used by the proof-of-work server system 104 may give particular properties to the resulting proof-of-work problems. For example, the proof-of-work server system 104 may generate problem-solving code that takes advantage of the particular properties that allow the proof-of-work server system 104 to control the work performed at the client computing device 102, such as the type of work, the amount of work, and the like. In some embodiments, the proof-of-work server system 104 uses permutation-based reordering techniques. Without limiting the techniques described herein, Example 3 describes permutation-based reordering in greater detail hereinafter.

Problem-Solving Code at the Client Computing Device

The proof-of-work server system 104 provides a proof of work problem to the client computing device 102 that includes the shuffled set of code blocks 230. The proof-of-work server system 104 also provides problem-solving code to the client computing device 102. The problem-solving code includes instructions to perform work to solve the proof-of-work problem. The problem solving component 118 operates when the problem-solving code provided by the proof-of-work server system 104 to the client computing device 102 executes on the client computing device 102.

The problem-solving component 118 performs compiling iterations on the shuffled set of code blocks 230. Each compiling iteration includes reordering the code blocks 202-210 of the shuffled set of code blocks 230 and testing whether the current order of code blocks 202-210 produces a valid proof-of-work solution. For example, to test whether a current ordering of the code blocks 202-210 in the shuffled set of code blocks 230 produces a valid proof-of-work solution, the problem-solving component 118 can generate test code 270 after reordering the shuffled set of code blocks 230 based on the current ordering. The problem-solving component 118 may then attempt to compile and/or execute the test code 270 to produce a valid key value 280. When the tested order of the shuffled set of code blocks 230 is incorrect, the test code 270 may fail to compile, fail to output or otherwise generate a valid key value, or generate a key value that is outside of a range of valid key values.

The problem-solving component 118 may stop performing compiling iterations after a final compiling iteration that produces a valid key value 280. For example, in the final compilation, the problem-solving component 118 has correctly reordered the shuffled set of code blocks 230A in the original order (e.g. the order of the set of code blocks 220 after the key generation code 200 is partitioned). In the compiling iteration, the problem-solving component 118 generates test code 270A, and compiles and executes the test code 270A to generate a valid key value 280. After the problem-solving component 118 generates the valid key value 280, the client computing device 102 submits a submission value 290 as proof that the client computing device 102 performed the work assigned by the proof-of-work server system 104. The submission value 290 may be the valid key value 280, or may be a value generated based on the valid key value 280. In some embodiments, the client computing device 102 sends the submission value 290 in an encrypted form. For example, the client computing device 102 may send the encrypted submission value 290 in a Binary Large OBject (BLOB).

The problem-solving code may execute in a manner that is transparent to a user of the client computing device 102. For example, the problem-solving code may execute in the background while a web page is rendered in a browser. In some embodiments, a proof-of-work problem is assigned to the client computing device 102 in anticipation of a protected transaction. For example, the client computing device 102 may be assigned the proof-of-work problem when the client computing device 102 requests and receives a web page that displays an interface for logging into a protected web system. The problem-solving code may execute to solve the proof-of-work problem in the background while the user enters authentication information.

Alternatively and/or in addition, the client computing device 102 may be assigned a proof-of-work problem that is expected to add a reasonable delay to a legitimate user's interaction with a protected system. For example, if solving the proof-of-work problem is expected to take around 500 ms at the client computing device 102, a legitimate user may not perceive a delay. However, such a delay may effectively prevent a denial of service attack from a plurality of computers controlled by an attacker. Moreover, such a delay would substantially reduce the efficiency of other attacks, such as credential stuffing attacks, data scraping, spamming, or other automated operations.

Compiler

The problem-solving component 118 uses a compiler 120 to perform compiling iterations when solving the proof-of-work problem. A compiler is a program that translates program code into a form more directly usable by the computing device. For example, the compiler 120 may translate source code or byte code to machine code that is executable by a processor of the client computing device 102. In some embodiments, the compiler 120 is already pre-installed at the client computing device 102. For example, the compiler 120 may be integrated in a browser application or another native application installed on the client computing device 102. In some embodiments, the proof-of-work server system 104 provides compiler code to the client computing device 102. When executed at the client computing device 102, the compiler code operates the compiler 120, which is then used to solve the proof-of-work problem.

It is possible to run program code on a computing device without compiling. For example, a standalone interpreter may translate individual lines of the program code into machine code instructions immediately before executing each individual line of code. However, performance tends to be lower. For example, because a compiler processes a set of code rather than individual lines of code, the compiler can analyze the code and perform a number of optimizations to generate more efficient machine code. Furthermore, for code that gets executed repeatedly, such as instructions within a programmatic loop, a standalone interpreter generally translates the repeated code to generate the corresponding machine code again each time the code is executed.

In some embodiments, the compiler is a just-in-time (JIT) compiler. A JIT compiler compiles portions of the program code as the program is executed. In contrast, an ahead-of-time (AOT) compiler compiles and translates the program code into machine language before the program is executed. A JIT compiler may work with an interpreter to evaluate the execution of the code by the interpreter and optimize the code during execution. For example, the interpreter may initially translate lines of code for execution, while the JIT compiler continuously analyzes the code being executed to identify portions of code where the efficiencies of compiling or recompiling code outweighs the overhead of compiling the portions of code. In some cases, JIT compilers can achieve better performance than static compilation before runtime by an AOT compiler because some optimization decisions can only be made at runtime. For example, a JIT compiler can be optimized for a particular class of CPUs and/or operating system of the actual execution environment (e.g. at client computing device 102) and perform optimizations accordingly. As used herein, the term "compiler" with respect to JIT compilers may refer to the JIT compiler alone, or the combination of the JIT compiler and other integrated components for executing or otherwise processing code, such as but not limited to the interpreter. For example, in a JavaScript engine that includes an interpreter and JIT compiler, the term "compiler" may refer to the JIT compiler, the combination of the JIT compiler and the interpreter, or the JavaScript engine.

In some embodiments, the key generation code includes JavaScript code, and the compiler 120 is a JavaScript engine with a JIT compiler. In each compiling iteration, the proof-of-work component 118 reorders the shuffled set of code blocks 122 to generate test code 126, and attempts to compile and execute the test code 126 by sending the test code 126 to the JavaScript engine (compiler 120) for processing. The JavaScript engine (compiler 120), including the interpreter and the JIT compiler, compiles and/or executes the test code 126 at runtime. In this case, the compiling and/or execution of the test code 126 may be carried out concurrently by the JavaScript engine (compiler 120). The JavaScript engine (compiler 120) may compile at least a portion of the test code 126. When the shuffled set of code blocks 122 is in the correct order, the test code 126 will generate a valid key value. When the shuffled set of code blocks 122 is not in the correct order, the JavaScript engine (compiler 120) may encounter an error at runtime instead of successfully interpreting and/or compiling the code. The JavaScript engine (compiler 120) may also fail to output or otherwise generate a key value, or generate a key value that is outside of a range of valid key values.

In some embodiments, the problem-solving code provided by the problem-solving code component 110 includes JavaScript code. When the problem-solving code is executed at the client computing device 102, a JavaScript engine (compiler 120) may also execute the problem-solving code to generate the problem-solving component 118. In some embodiments, the proof-of-work server system 104 provides the problem-solving code to a browser executing at the client computing device 102 in response to a request from the browser. The problem-solving code may be provided along with web content requested by the browser. When the browser receives the problem-solving code, the browser executes the problem-solving code using the JavaScript engine (compiler 120), thereby generating the problem-solving component 118 at the client computing device 102.

In some embodiments, the proof-of-work server system 104 provides the problem-solving code and/or the shuffled set of code blocks 122 as bytecode. Bytecode is an intermediate representation of program code. Unlike machine code, bytecode is not directly executed by a processor of the client computing device 102. However, bytecode can be run on a virtual machine that generates machine code that can be directly executed by the processor of the client computing device 102. Generally, bytecode is portable across different platforms as long as a compatible virtual machine exists for the client computing device 102 to generate environment-specific machine code.

Isolated Runtime Environment

The proof-of-work server system 104 may provide isolated runtime environment code that, when executed at the client computing device 102, creates an isolated runtime environment that includes a compiler 120, such as but not limited to a JavaScript engine. In some embodiments, the isolated runtime environment includes a virtual machine for executing test code 126. The virtual machine may also run the problem-solving code to generate the problem-solving component 118 inside of the virtual machine. The virtual machine may execute bytecode corresponding to one or more of the problem-solving component 118 and the test code 126.

The isolated runtime environment provides a sandboxed environment for execution of the test code 126 without external consequences that could potentially affect the client computing device 102. For example, the isolated runtime environment may prevent interaction between the executing test code 126 and code, data or memory for other programs. In some embodiments, the isolated runtime environment prevents interaction between the executing test code 126 and unrelated web pages or web content loaded by a browser application that is executing the virtual machine. The proof-of-work server system 104 may enforce the usage of the isolated runtime environment to generate the submission value 124.

The isolated runtime environment may prevent unpredictable effects of running test code 126 generated from an incorrect ordering of the shuffled set of code blocks 122. Because of the large number of potential orderings of the shuffled set of code blocks 122, the result of executing all possible test code 126 generated from any order of the shuffled set of code blocks 122 may not be known. Incorrectly-ordered test code 126 may also continue to execute without guaranteed termination, such as when a loop is created. In some embodiments, the isolated runtime environment includes a compiler 120 that terminates execution of the test code 126 when excessive computation time is detected. For example, JavaScript engines generally limits a call stack size that prevents excessive recursion. When the call stack size is exceeded, an error is thrown.

Proof-of-Work Verification

The work verification component 114 verifies that the client computing device 102 performed the work required by the proof-of-work problem. The work verification component 114 verifies the submission value 124 based on the expected key value. For example, when the submission value 124 is the valid key value determined by the client computing device 102, the work verification component 114 may compare the submission value 124 to the expected key value generated by the key generation code corresponding to the proof-of-work problem to determine whether the submission value 124 matches the expected key value. As another example, when the client computing device 102 applies a function to the valid key value to generate the submission value 124, the work verification component 114 may apply the same function to the expected key value and compare the result to the key submission value. Alternatively and/or in addition, the work verification component 114 may apply one or more functions to the submission value 124. The submission value 124 is considered correct when the submission value 124 matches the expected key value, or when the underlying key value used to generate the submission value 124 matches the expected key value.

In some embodiments, the proof-of-work server system 104 stores the expected key value generated by the original key generation code and compares the stored expected key value and the received key submission value 124. Alternatively and/or in addition, the proof-of-work server system 104 may apply one or more functions to the expected key value before storing the resulting value to use in verifying the submission value 124. For example, the proof-of-work server system 104 may generate an expected submission value based on the expected key value. The submission value 124 is considered correct when the submission value 124 matches an expected key value, an expected submission value, or when the underlying key value used to generate the submission value 124 matches the expected key value. If the submission value 124 is correct, the work verification component 114 determines that the client computing device 102 performed the assigned work.

In some embodiments, the proof-of-work server system 104 provides the client computing device 102 the expected key value in an encrypted form. For example, encrypted data that includes the expected key value, or an expected value generated based on the expected key value, may be encrypted using a server secret not known to the client computing device 102. The encrypted data, including the expected value, is unreadable to the client computing device 102. After generating the submission value 124, the client computing device 102 may pass the encrypted data back to the proof-of-work server system 104 along with the submission value 124. The client computing device 102 may pass the submission value 124 to the proof-of-work server system 104 in a communication directed to the proof-of-work server system 104, or in a communication directed to another computer system that forwards the submission value 124 to the proof-of-work server system 104. The work verification component 114 can decrypt the encrypted data to obtain the expected value without storing and tracking the expected key value associated with the current proof-of-work problem. For example, encrypted data that includes the expected value may be transmitted to the client computing device 102 in a cookie. The client computing device 102 may pass the cookie containing the encrypted data when the client computing device 102 transmits the submission value 124. The proof-of-work server system 104 may decrypt the encrypted data in the cookie using a server secret not known to the client computing device 102 to obtain the expected value for comparison with the submission value 124 without having to store the expected key value, expected value based on the key value, or data linking the expected key value to the particular proof-of-work problem provided for the client computing device 102.

The proof-of-work server system 104 may modify either the original expected key value or the received submission value 124 when verifying the submission value 124. For example, the expected key value may be hashed or otherwise modified. The proof-of-work server system 104 may compare the submission value 124 to the modified expected key value by applying the same modifications to the submission value 124 before comparing. In some embodiments, the problem-solving component 118 applies one or more modifications to the submission value 124 at the client computing device 102 before providing the submission value 124 as proof of work.

When the submission value 124 is correct, the proof-of-work server system 104 perform a positive action in response to determining that the key submission value 124 is correct. For example, the proof-of-work server system 104 may allow a request from the client computing device 102 to proceed, such as by forwarding the request to a web server system 106. For example, in response to receiving a request from the client computing device 102, the proof-of-work server system 104 may assign a proof-of-work problem to the client computing device 102 and require the client computing device 102 to submit a correct submission value 124 from the client computing device 102 before further processing the request. In some embodiments, the positive action includes treating the client computing device as a legitimate device. For example, the positive action may include waiting a period of time before another proof-of-work problem is provided to the client computing device, providing a future proof-of-work problem with less expected computation required, processing a certain amount of traffic from the client computing device, and the like.

The client computing device 102 fails the proof-of-work problem if the client computing device 102 provides an incorrect answer to the proof-of-work problem, such as by submitting a submission value that does not match the expected key value generated by the original key generation code. If the client computing device 102 fails the proof-of-work problem, the proof-of-work server system 104 may perform a negative action. For example, the proof-of-work server system 104 may block the corresponding request or otherwise stop processing the request from the client computing device 102. For example, when the proof-of-work server system 104 is protecting the web server system 106, the proof-of-work server system 104 may drop a request submitted from the client computing device 102 to the web server 106 when the client computing device does not provide a correct submission value 124.

In some embodiments, when the client computing device 102 fails the proof-of-work problem, the proof-of-work server system 104 classifies the client computing device 102 as under the control of malware, or as otherwise compromised. Alternatively and/or in addition, the proof-of-work server system 104 may take additional precautions against future interactions by the client computing device 102, such as by requiring additional proof-of-work problems to be completed.

Example 1: Protecting a Web Server System

In some embodiments, the proof-of-work server system 104 provides a proof-of-work problem to a client computing device 102 when the client computing device 102 submits a request to a web server system 106 or otherwise interacts with the web server system 106. For example, the proof-of-work server system 104 may provide a proof-of-work problem to the client computing device 102 when the client computing device 102 requests a web page hosted by the web server system 106, interacts with one or more elements of a web page hosted by the web server system 106, interacts with a web application executing in a browser application of the client computing device 102, interacts with a native application installed on executing on the client computing device 102, or otherwise interacts with the web server system 106.

The web server system 106 hosts web content 108 and makes the web content 108 available to the client computing device 102 and other client computing devices. The web content 108 may include one or more web pages, images, audio, video, messages, files, data, scripts, services, application content, and other content available over the network 150. The client computing device 102 interacts with the web server system 106 by requesting the web content 108 over the network 150. For example, the client computing device 102 may request and display a web page or web application in a browser or another application that handles web content 108.

In some embodiments, the client computing device 102 interacts with the web server system 106 by submitting requests from an application executing on the client computing device 102, such as a web application executing in a browser or a native application developed for use on a particular platform or device. In some embodiments, the client computing device 102 is a mobile device, such as a mobile device running the Android platform, the Windows Mobile platform, or the iOS platform, and the application is a native application developed for the respective mobile platform. The proof-of-work server system 104 may be configured to require proof-of-work from the client computing device 102 before allowing the request to reach the web server system 106.

In some embodiments, the proof-of-work server system 104 requires proof-of-work once in a session between the client computing device 102 and the web server system 106. Alternatively and/or in addition, the proof-of-work server system 104 may require proof-of-work for particular transaction types, such as when a particular type of transaction is a greater security risk. For example, the proof-of-work server system 104 may require proof-of-work for transactions that will require a large amount of processing by the web server system 106, making the web server system 106 vulnerable to a denial of service attack. For example, the proof-of-work server system 104 may require proof-of-work transactions to modify an online shopping cart, account modification transactions, transactions that require data lookup or data processing, and/or other transactions that require a large amount of processing. Alternatively and/or in addition, the proof-of-work server system 104 may require proof-of-work for high-stakes transactions that legitimate users submit relatively infrequently, such as authentication transactions, account creation transactions, or transactions involving the transfer of money.

After the work verification component 114 verifies the submission value 124 submitted by the client computing device 102, the proof-of-work server system 104 allows the request or other interaction from the client computing device 102 to proceed. For example, the proof-of-work server system 104 may intercept or otherwise receive a request from the client computing device 102 that is directed to the web server system 106 and forward the request to the web server system 106 after verifying proof-of-work by the client computing device 102. As another example, the web server system 106 may receive a request from the client computing device 102 and instruct the proof-of-work server system 104 to verify proof-of-work by a client computing device 102. The proof-of-work server system 104 may notify the web server system 106 after verifying proof-of-work by the client computing device 102 so that the web server system 104 proceeds with processing the request.

The proof-of-work server system 104 may be adapted to perform additional security functionality. For example, the proof-of-work server system 104 may detect and/or deflect malicious activity with respect to the web server system 106, such as by serving code for one or more other security countermeasures to the client computing device 102 when the client computing device 102 interacts with the web server system 106. For example, the proof-of-work server system 104 may operate in a security server system that implements one or more additional security countermeasures to protect the web server system 106.

Example 2: Partitioning to Prevent Circumvention of Work

When the client computing device 102 is under control of an attacker, the attacker may attempt to circumvent the work assigned to the client computing device 102. For example, instead of performing compiling iterations to reorder the shuffled set of code blocks 230 and attempt to compile and execute the corresponding test code, the attacker may attempt to compute an order of the shuffled set of code blocks 230 based on the content of the code blocks 202-210. For example, given that the correct ordering of code blocks 202-210 forms executable test code 270A when combined, an attacker may attempt to circumvent the expected work by generating valid code based on context, such as code structure, operators and/or syntax of a particular programming language in which the key generation code is written. For example, the attacker may use software that determines valid or invalid orderings of the code blocks 202-210 in a manner that is faster than attempting to compile and execute test code corresponding to the ordering of the code blocks 202-210. The software may attempt to find the correct orderings of code blocks 202-210, and/or eliminate incorrect orderings to reduce the number of compiling iterations performed to find the correct ordering of code blocks 202-210.

In some cases, an attacker may use software that evaluates the endings of the code blocks 202-210 and the beginnings of the code blocks 202-210 to find which ordered pairs of code blocks that would be syntactically valid or invalid. For example, if code block D ends with the JavaScript statement: 'document.', then the software may infer that, in the correct ordering of code blocks 202-210, the block that follows code block D would begin with a property or method of the JavaScript Document object. If code block E begins with 'write ("Hello World!")', and no other code block begins with a property or method of the JavaScript Document object, then the software may correctly infer that, in the original ordering of the code blocks 202-210, code block D comes immediately before code block E. On the other hand, if code block A begins with 'getElementsByName( )' in addition to code block E beginning with 'write ("Hello World!")', then the software may correctly infer that code block D comes immediately before either code block E or code block A. In this case, the software may eliminate orderings of the code blocks 202-210 where code block D is followed by code block B or code block C.

In some embodiments, the proof-of-work server system 104 partitions the key generation code 200 by inserting one or more context-ambiguous features into the key generation code 200 and dividing the key generation code 200 to generate the set of code blocks 220. The context-ambiguous features may make it difficult to apply certain rules or heuristics to determine valid orderings of the code blocks 202-210. For example, the context-ambiguous features may make it computationally expensive to determine a valid ordering of the code blocks 202-210. Alternatively and/or in addition, the context-ambiguous features may make it more computationally involved to apply particular rules or heuristics to determine valid orderings of the code blocks 202-210 such that a computational advantage is not gained by using such rules or heuristics compared to performing the compiling iterations.

One type of context-ambiguous feature involves ambiguous operator characters. For example, the character '/' may appear in code as a division operator between two values or as a comment (e.g. //, /*, and */). Another example is the character '+', which may appear as an addition operator + between two values, or as part of an increment operator ++ that appears after a variable. In some embodiments, extra code that includes ambiguous operator characters are inserted into the key generation code 200 to make assembly of the code blocks 202-210 more complex. For example, if a particular code block ends at a character '+', additional code including the symbol '+' may be inserted into the key generation code 200 to provide additional context-ambiguous split points. Inserted code may include code that does not affect the operation of the key generation code 200, such as characters placed within comments, statements that do not operate on objects and/or variables originally in the key generation code 200, sets of statements that undo any results caused by the set of statements, or other code that does not affect the operation of the key generation code 200.

Another type of context-ambiguous feature involves paired brackets, such as ( ), [ ], and { }. Such brackets may indicate function calls, order of operation, arrays, or other programming constructs. In most programming languages, syntactically valid code includes properly paired brackets. In some embodiments, additional brackets are added in the key generation code 200 before the key generation code 200 is partitioned into the set of code blocks 220. The additional brackets may be unpaired or paired, and may appear in comments. An attacker may use software to assemble the code blocks 202-210 by pairing brackets appropriately. However, an increased number of brackets and/or the presence of brackets in comments will make it difficult or infeasible to assemble the code blocks 202-210 efficiently.

For example, the proof-of-work server system 104 may evaluate the key generation code 200 for potential context-ambiguous split points, or points to divide the code that make the resulting code blocks 202-210 difficult to reassemble. In some embodiments, partitioning the key generation code 200 includes both dividing the key generation code 200 at a context-ambiguous split point and inserting additional characters in one or more code blocks 202-210 to increase order ambiguity. For example, to make it impossible or more difficult to find a correct order of the code blocks 202-210 based on rules or heuristics, additional bracket characters may be added in comments.

Example 3: Permutation-Based Reordering

Figure 3A:
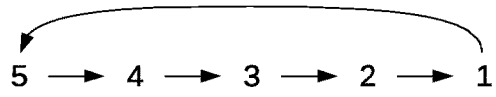
FIGS. 3A-3C illustrate a permutation for reordering a set of code blocks in an example embodiment.

In some embodiments, the proof-of-work server system 104 generates the shuffled set of code blocks 122 based on a permutation. A permutation is a function that rearranges the order of terms in a sequence. FIG. 3A illustrates a permutation for reordering a set of code blocks in an example embodiment. The permutation $\sigma$ is represented in cyclic notation $\sigma=(5\ 4\ 3\ 2\ 1)$ and is also illustrated as a diagram.

In cyclic notation, a permutation is represented as one or more cycles. A cycle is indicated by a pair of parentheses that contains a list of one or more positions. $\sigma$ is a permutation that has one cycle, $(5\ 4\ 3\ 2\ 1)$. When two positions are listed consecutively in a cycle, the element at the latter position goes to the former position when the permutation is applied. For example, when $\sigma$ is applied to a sequence of 5 elements, "5 4" indicates that element in the fifth position goes to the fourth position. "4 3" indicates that the element in the fourth position goes to the third position. "3 2" indicates that the element in the third position goes to the second position. "2 1" indicates that the element in the second position goes to the first position. A cycle is a circular concept, so the numbers wrap around. Thus, when $\sigma$ is applied, the element in the first position goes to the fifth position. Because a cycle is circular, $(5\ 4\ 3\ 2\ 1)$ is equivalent to $(4\ 3\ 2\ 1\ 51)$, $(3\ 2\ 1\ 5\ 4)$, $(2\ 1\ 5\ 4\ 3)$, and $(1\ 5\ 4\ 3\ 2)$.

Example 3.1: Applying a Permutation Multiple Times

Figure 3B:

In some embodiments, the proof-of-work server system 104 generates the shuffled set of code blocks 122 by applying a base permutation multiple times. FIG. 3B illustrates applying a base permutation to a sequence multiple times in an example embodiment. As used herein, $\sigma^t$ refers to a permutation that is equivalent to applying the base permutation $\sigma$ t times. In FIG. 3B, the base permutation $\sigma$ is applied various numbers of time to an original sequence A B C D E. The sequence may represent an ordering of code blocks, such as code blocks 202-210 of FIG. 2.

$\sigma$ is the base permutation. $\sigma^0$ is equivalent to applying $\sigma$ zero times to the original sequence. $\sigma^0$ of the original sequence A B C D E is A B C D E. $\sigma^1$ is equivalent to applying $\sigma$ one time to the original sequence. $\sigma^1$ of the original sequence A B C D E is B C D E A. $\sigma^2$ is equivalent to applying $\sigma$ two times to the original sequence. $\sigma^2$ of the original sequence A B C D E is C D E A B. $\sigma^3$ is equivalent to applying $\sigma$ three times to the original sequence. $\sigma^3$ of the original sequence A B C D E is D E A B C. $\sigma^4$ is equivalent to applying $\sigma$ four times to the original sequence. $\sigma^4$ of the original sequence A B C D E is E A B C D. $\sigma^5$ is A B C D E, or applying $\sigma$ five times to the original sequence. $\sigma^5$ is also equivalent to $\sigma^0$ given the circular properties of the single cycle $(5\ 4\ 3\ 2\ 1)$ of $\sigma$.

The permutations $\sigma^t$ shown in FIG. 3B can be generated by applying the base permutation $\sigma$ to the result of the prior permutation $\sigma^{t-1}$. For example, $\sigma^3$ can be generated by applying $\sigma$ once to the result of applying $\sigma^2$. The cyclic notation of a permutation $\sigma^t$ can also be calculated using the cyclic notation of the base permutation $\sigma$. After the cyclic notation of $\sigma^t$ is generated, it can be applied directly to a sequence rather than applying $\sigma$ t times. The calculation of the permutation $\sigma^t$ from $\sigma$ is computationally faster than calculating each $\sigma^{n+1}$ from the prior permutation $\sigma^n$.

Figure 3C:
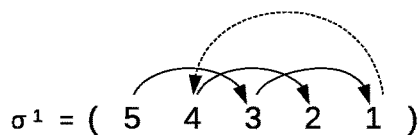
Figure 3C:
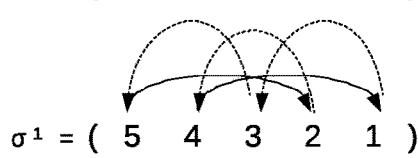
Figure 3C:
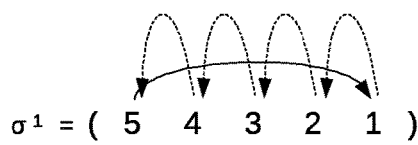

FIG. 3C illustrates the calculation of permutations $\sigma^t$ that are equivalent to applying the base permutation $\sigma$ t times in an example embodiment. $\sigma^t$ can be calculated based on the cyclic notation of $\sigma$. Generally, $\sigma^t$ can be represented in cyclic notation by skipping t positions in each cycle of $\sigma$. For example, each cycle of $\sigma^2$ can be calculated by starting with a position in each cycle of $\sigma$ and listing every second element, as shown by the arrows over $\sigma^1$. $\sigma^3$ has one cycle that can be calculated by listing every third element of the cycle in $\sigma^1$. $\sigma^4$ has one cycle that can be calculated by listing every fourth element of the cycle in $\sigma^1$.

$\sigma^5$ has one five cycles. A cycle with a single element (x) is an identity cycle. The cycle (x) indicates that the element at position x remains in the same position. Because the cycle $(5\ 4\ 3\ 2\ 1)$ has a length of 5, skipping forward five positions from any position will arrive at the same position. Although $\sigma$ has one cycle $(5\ 4\ 3\ 2\ 1)$, a permutation $\sigma^t$ can have multiple cycles, such as $\sigma^5$, which has 5 cycles.

Example 3.2: Inverse Permutation

In some embodiments, the proof-of-work server system 104 provides problem-solving code to the client computing device 102 that, when executed, attempts to reorder the shuffled set of code blocks 122 by applying an inverse permutation to the shuffled set of code blocks 122. An inverse permutation undoes the effect of applying the base permutation one time. The inverse permutation is applied to the shuffled set of code blocks 122 during each compiling iteration. The notation $\sigma^{-1}$ refers to an inverse permutation corresponding to the permutation $\sigma$. One way to calculate $\sigma^{-1}$ is to enumerate the positions of each cycle of $\sigma$ in reverse order. In FIGS. 3B-3C, the inverse permutation $\sigma^{-1}$ is equivalent to $\sigma^4$.

The proof-of-work server system 104 may provide the client computing device 102 an inverse permutation that corresponds with the shuffled set of code blocks 122. The inverse permutation may be provided as part of the proof-of-work problem. In some embodiments, the inverse permutation is integrated in the problem-solving code so that, when the problem-solving code is executed at the client computing device 102, the resulting problem-solving component 118 performs the inverse permutation on the shuffled set of code blocks 122 in each compiling iteration.

The proof-of-work server system 104 may calculate $\sigma^t$ for a base permutation $\sigma$ and a particular value of t, then apply $\sigma^t$ to a set of code blocks (e.g. 220) to generate a shuffled set of code blocks (e.g. 230). The proof-of-work server system 104 also calculates the corresponding inverse permutation $\sigma^{-1}$. The proof-of-work server system 104 may generate this proof-of-work problem with a relatively small amount of computation that is proportional to the length of the base permutation σ.

To solve the proof-of-work problem, the client computing device 102 performs t compiling iterations. In each compiling iteration, the client computing device 102 reorders the shuffled set of code blocks 122 by applying $\sigma^{-1}$ one time, generates test code 126 after reordering the shuffled set of code blocks 122, and attempts to compile and execute the test code 126 to generate a valid key value. Because the client computing device 102 does not have knowledge of the value of t, the client computing device 102 must attempt to compile and execute test code 126 to determine whether the current ordering of the code blocks is correct after each reordering of the shuffled set of code blocks 122 by applying $\sigma^{-1}$ one time. At the client computing device 102, the problem-solving code will find a solution in O(t) time by performing t compiling iterations, while the proof-of-work server system 104 can verify a solution in O(1) time.

Example 3.3: Tuning Amount of Work to Solve Proof-of-Work Problem

The proof-of-work server system 104 may tune the computation required to solve the proof-of-work problem. For example, the proof-of-work server system 104 may increase the number of code blocks that the client computing device 102 needs to correctly reorder. Alternatively and/or in addition, when the proof-of-work server system 104 calculates $\sigma^t$ for a base permutation σ and a particular value of t and applies $\sigma^t$ to the set of code blocks to generate the shuffled set of code blocks 122, the proof-of-work server system 104 may tune the computation required by selecting a larger or smaller value for t. A larger t requires the client computing device 102 to perform more compiling iterations, while a smaller t requires the client computing device 102 to perform fewer compiling iterations.

The proof-of-work server system 104 may dynamically tune the amount of work required to solve the proof-of-work problem based on the current load on a protected system, such as the web server system 106. For example, if the web server system 106 is experiencing difficulty responding to requests, the proof-of-work server system 104 may increase the difficulty of each proof-of-work problem to generally slow down requests to the web server system. Alternatively and/or in addition, the proof-of-work server system 104 may increase the number of proof-of-work problems assigned, such as by changing the number of problems assigned during a session, assigning proof-of-work problems for more request types, and other methods that would increase the number of proof-of-work problems assigned. In some embodiments, if the proof-of-work server system 104 detects a denial-of-service attack, the proof-of-work server system may tune the proof-of-work techniques described herein to address the attack. By tuning these factors, the proof-of-work server system 104 can address dynamic loads that are placed on the web server system 106 or another protected system.

The proof-of-work server system 104 may increase the amount of work required to solve a proof-of-work problem based on suspicious activity. For example, if the proof-of-work server system 104 detects or is notified of potentially suspicious activity associated with a particular client computing device 102, the proof-of-work server system 104 may adjust the difficulty or the number of proof-of-work problems assigned to the client computing device 102. As another example, if a client computing device 102 provides proof-of-work more quickly than expected, the proof-of-work server system 104 may increase the amount of work expected from the client computing device 102. In some embodiments, the proof-of-work server system 104 may assign one or more additional proof-of-work problems, with one or more different required difficulties, to a client computing device 102 before processing the original request from the client computing device 102.

In some embodiments, the proof-of-work server system 104 tunes the amount of work to be lower when the proof-of-work server system 104 detects that the amount of work at the client computing device 102 would interfere with a legitimate user's experience. For example, if a prior proof-of-work problem or a test proof-of-work problem takes unusually long, the proof-of-work server system 104 may adjust the amount of work so that solving the proof-of-work problem does not create an unacceptable delay at the client computing device 102.

Example 3.4: Permutation Order

Figures 4A, 4B:
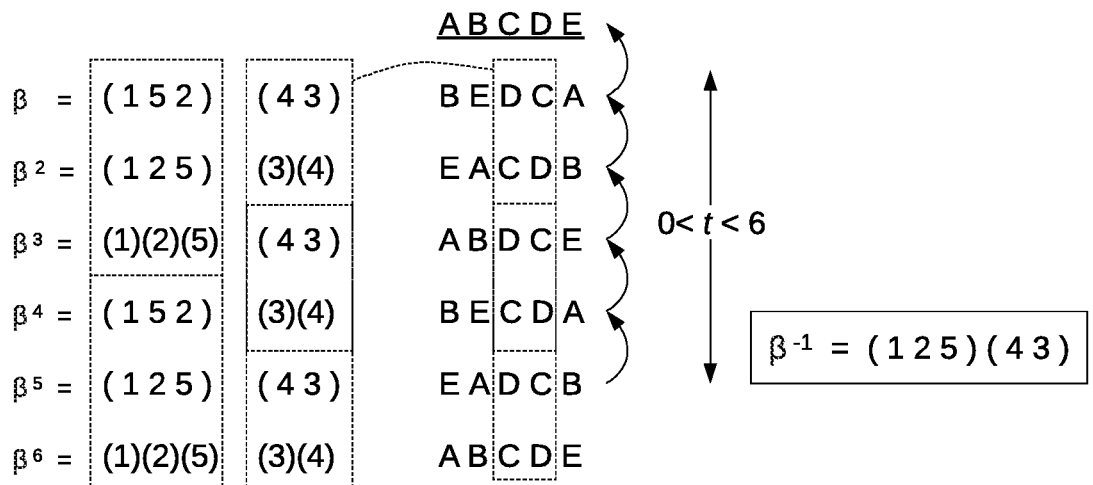
FIGS. 4A-4B illustrate permutations for reordering a set of code blocks in an example embodiment.

FIG. 4A illustrates a base permutation with one cycle in an example embodiment. A base permutation α has a single cycle of length 5. The order of α is five because there are five possible permutations based on α before the identity permutation is reached at $\alpha^5$. Put another way, by applying α one or more times, a total of five unique orderings of a sequence can be produced, as shown with the sequence A B C D E. When a permutation has a single cycle, the order of the permutation is the length of the cycle.

FIG. 4B illustrates a base permutation with two cycles in an example embodiment. The base permutation β has one cycle of length 3 and one cycle of length 2. The order of β is six because there are six possible permutations based on β before the identity permutation is reached at $\beta^6$. Put another way, by applying β one or more times, a total of six unique orderings of a sequence can be produced, as shown with the sequence A B C D E.

In some embodiments, the proof-of-work server system 104 generates a base permutation using multiple cycles that are prime and/or co-prime. Two numbers are co-prime if they do not share a factor other than 1. For example, 2 and 3 are both prime because each is not divisible by an integer other than itself and 1. A set of prime numbers are also co-prime. However, a set of co-prime numbers may not all be prime. For example, 6 and 7 are co-prime because they do not share a factor other than 1, even though 6 is not prime (since 6 is also divisible by 2). When a permutation has multiple cycles that are co-prime, then the order of the permutation is the product of the length of the cycles. This can help create permutations of higher order. For example, the order of α, 5, is less than the order of β, 6, even though the length of α and β is equal. This difference is more evident with longer permutations. For example, a permutation of length 17 with one cycle (e.g. (1 2 3 4 5 6 7 8 9 10 11 12 13 14 15 16 17)) has an order of 17, while a permutation of length 17 with cycles of length 2, 3, 5, and 7 (e.g. (1 2) (3 4 5) (6 7 8 9 10) (11 12 13 14 15 16 17)) has an order of 210.

Using a permutation with a high order as the base permutation enables the proof-of-work server system 104 to have more control over tuning because the number of computing iterations required to solve a single permutation-based proof-of-work problem is limited to the order of the permutation. The proof-of-work server system 104 can apply a permutation $\sigma^t$ and have the client computing device 102 perform t compiling iterations using the inverse permutation $\sigma^{-1}$, where t is an integer less than the order of the permutation.

Example 4: Using t for Verification

In some embodiments, a client computing device 102 submits the number of times it applied the inverse permutation function to the shuffled set of code blocks (e.g. 230) to generate a valid key value. For example, if the proof-of-work server system 104 applies a permutation $\sigma^t$ function to a set of code blocks (e.g. 220) to generate the shuffled set of code blocks (e.g. 230) provided to the client computing device 102, the client computing device 102 applies the inverse permutation $\sigma^{-1}$ t' times to generate a valid key value (e.g. 280). The client computing device 102 may submit the value t' to the proof-of-work server system 104 for verification. The value t' may be submitted in addition to the key submission value as an additional verifiable value, or may be submitted without the key value.

In some embodiments, the client computing device 102 sends both the value t' and the key submission value to the proof-of-work server system 104. When both values are sent for verification, the proof-of-work problem can detect an accidental or random discovery of a correct key submission value by the client computing device 102 that did not execute the problem-solving code. The proof-of-work server system may check the submitted proof-of-work solution by applying the inverse permutation $\sigma^{-1}$ t' times to determine whether the key submission value is correct. The client computing device 102 may also send additional information so that the proof-of-work server system 104 does not need to store or otherwise maintain proof-of-work problem data. For example, the client computing device 102 may send the key submission value, t', the shuffled set of code blocks (e.g. 122), and the inverse permutation $\sigma^{-1}$.

In some rare circumstances, another permutation $\sigma^{t2}$ of the shuffled set of code blocks may happen to generate a valid key submission value, even though t2 is not the same value t chosen by the proof-of-work server system 104. If t2 is less than t, the client computing device 102 will find another valid key submission value in t2 compiling iterations rather than the expected key value (e.g. 250). When the client computing device 102 submits the value t2 for verification, the proof-of-work server system 104 can still use the submitted value t2 to verify that the client computing device performed the required work to find a valid solution to the proof-of-work problem.

Example Processes

Figure 5:
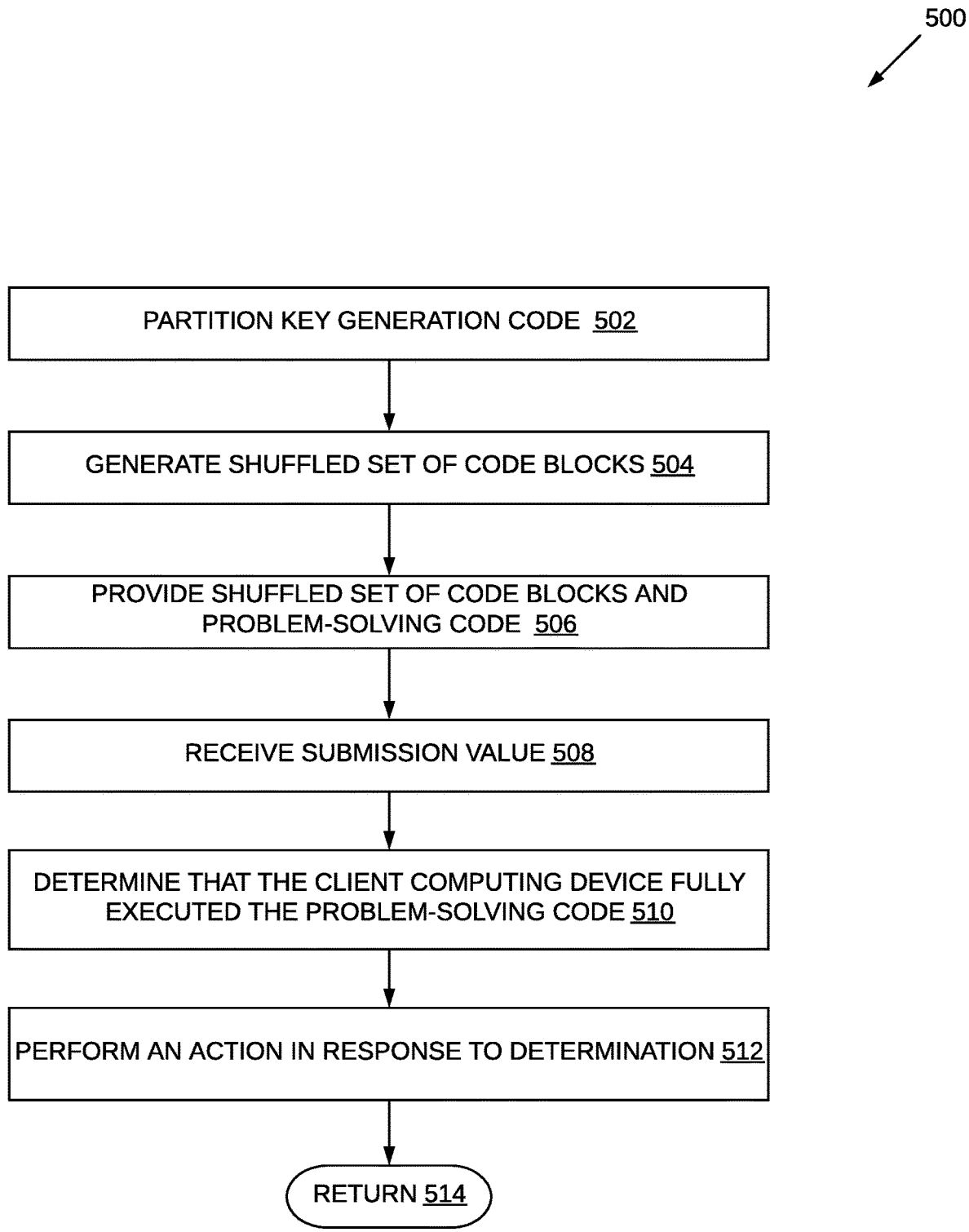
FIG. 5 is a flow diagram of a process for proof of work verification based on runtime compilation in an example embodiment.

FIG. 5 is a flow diagram of a process for proof-of-work based on runtime compilation in an example embodiment. Process 500 may be performed by one or more computing devices and/or processes thereof. For example, one or more blocks of process 500 may be performed by a computer system, such as but not limited to computer system 600. In one embodiment, one or more blocks of the process 500 are performed by a security system, such as proof-of-work server system 104. Process 500 will be described with respect to proof-of-work server system 104, but is not limited to performance by proof-of-work server system 104.

At block 502, the proof-of-work server system 104 partitions key generation code into a set of code blocks. When compiled and executed, the key generation code generates an expected key value. The expected key value is the solution to a proof-of-work problem that the proof-of-work server system 104 will assign to a client computing device. In some embodiments, the proof-of-work server system 104 assigns the proof-of-work problem to the client computing device when the client computing device interacts with a web server system and/or requests a particular type of transaction from the web server system. In some embodiments, the proof-of-work server system 104 partitions the key generation code by inserting one or more context-ambiguous features into the key generation code and dividing the key generation code.

At block 504, the proof-of-work server system 104 generates a shuffled set of code blocks by reordering the set of code blocks. In some embodiments, the proof-of-work server system 104 generates the shuffled set of code blocks based on a base permutation. For example, the proof-of-work server system 104 may calculate a permutation from a base permutation that is equivalent to applying the base permutation t times, and apply the permutation to the set of code blocks to generate the shuffled set of code blocks. In some embodiments, the proof-of-work server system 104 tunes the amount of work necessary to solve the proof-of-work problem by using a larger or smaller value for t.

At block 506, the proof-of-work server system 104 provides, to a client computing device, the shuffled set of code blocks and problem-solving code that, when executed at the client computing device, reconstructs the key generation code to generate a key submission value by performing one or more compiling iterations. In each compiling iteration, the problem-solving code, when executed by the client computing device, reorders the shuffled set of code blocks to generate test code, and attempts to compile and execute the test code to generate the key submission value. In some embodiments, the proof-of-work server system 104 provides an inverse permutation that, when applied, has the effect of undoing the effect of applying the base permutation one time. The client computing device is expected to solve the problem by applying the inverse permutation to the shuffled set of code blocks and attempting to compile and execute the resulting test code t times to obtain a valid key submission value.

At block 508, the proof-of-work server system 104 receives the key submission value generated at the client computing device. In some embodiments, the problem-solving code transmits the key submission value when a valid key submission value is generated at the client computing device.

At block 510, the proof-of-work server system 104 determines that the client computing device fully executed the problem-solving code based on verifying the submission value. For example, the proof-of-work server system 104 may store the expected key value generated by the original key generation code (or an expected value generated based on the expected key value) and compare the stored value and the received submission value. If the submission value is correct, the proof-of-work server system 104 determines that the client computing device performed the assigned work by fully executing the problem-solving code. In some embodiments, the proof-of-work server system 104 provides the client computing device the expected key value, or an expected value generated based on the expected key value, in encrypted data that is unreadable to the client computing device, and the client computing device passes the encrypted data back to the proof-of-work server system 104 along with the key submission value. The proof-of-work server system 104 can decrypt the encrypted data to obtain the expected value without storing and tracking the expected value associated with the current proof-of-work problem.

At block 512, in response to determining that the client computing device fully executed the problem-solving code, the proof-of-work server system 104 performs a positive action. For example, the proof-of-work server system 104 may allow a request from the client computing device to proceed. For example, the proof-of-work server system 104 may receive a request from the client computing device that is directed to a web server and forward the request after verifying proof-of-work by the client computing device. As another example, the proof-of-work server system 104 may verify proof-of-work submitted to the web server system and indicate, to the web server system, that proof-of-work is successfully verified so that the web server system proceeds to process to the request. In some embodiments, the proof-of-work server system 104 is operated by a web server system. In some embodiments, the positive action includes treating the client computing device as a legitimate device. For example, the positive action may include waiting a period of time before another proof-of-work problem is provided to the client computing device, providing a future proof-of-work problem with less expected computation required, processing a certain amount of traffic from the client computing device, and the like.

At block 514, process 500 returns and/or terminates. For example, process 500 may pass control to a calling process, generate any appropriate record or notification, return after a method or function invocation, process a next proof-of-work operation, or terminate.

Implementation Mechanisms—Hardware Overview

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 6:
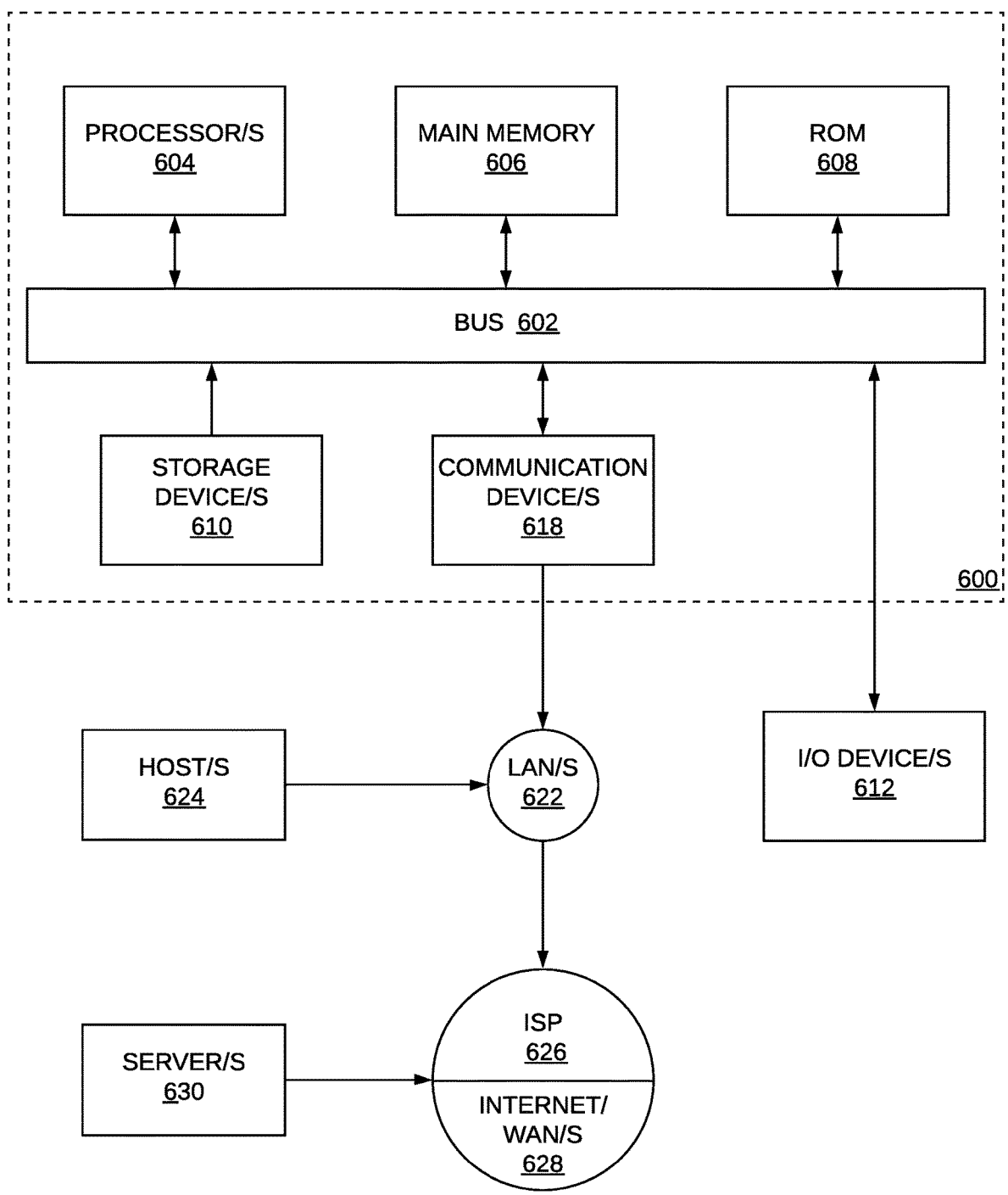
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and one or more hardware processors 604 coupled with bus 602 for processing information, such as basic computer instructions and data. Hardware processor/s 604 may include, for example, one or more general-purpose microprocessors, graphical processing units (GPUs), coprocessors, central processing units (CPUs), and/or other hardware processing units.

Computer system 600 also includes one or more units of main memory 606 coupled to bus 602, such as random access memory (RAM) or other dynamic storage, for storing information and instructions to be executed by processor/s 604. Main memory 606 may also be used for storing temporary variables or other intermediate information during execution of instructions to be executed by processor/s 604. Such instructions, when stored in non-transitory storage media accessible to processor/s 604, turn computer system 600 into a special-purpose machine that is customized to perform the operations specified in the instructions. In some embodiments, main memory 606 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 600 may further include one or more units of read-only memory (ROM) 608 or other static storage coupled to bus 602 for storing information and instructions for processor/s 604 that are either always static or static in normal operation but reprogrammable. For example, ROM 608 may store firmware for computer system 600. ROM 608 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 610, such as a magnetic disk or optical disk, is provided and coupled to bus 602 for storing information and/or instructions. Storage device/s 610 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 600 may be coupled via bus 602 to one or more input/output (I/O) devices 612. For example, I/O device/s 612 may include one or more displays for displaying information to a computer user, such as a cathode ray tube (CRT) display, a Liquid Crystal Display (LCD) display, a Light-Emitting Diode (LED) display, a projector, and/or any other type of display.

I/O device/s 612 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 604 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some embodiments, the one or more I/O device/s 612 may include a device with combined I/O functionality, such as a touch-enabled display.

Other I/O device/s 612 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor/s 604 over bus 602.

Computer system 600 may implement the techniques described herein using customized hard-wired logic, one or more ASICs or FPGAs, firmware or program logic which, in combination with the computer system causes or programs, causes computer system 600 to be a special-purpose machine. According to one embodiment, the techniques herein are performed by computer system 600 in response to processor/s 604 executing one or more sequences of one or more instructions contained in main memory 606. Such instructions may be read into main memory 606 from another storage medium, such as one or more storage device/s 610. Execution of the sequences of instructions contained in main memory 606 causes processor/s 604 to perform the process steps described herein. In alternative embodiments, hard-wired circuitry may be used in place of or in combination with software instructions.

Computer system 600 also includes one or more communication interfaces 618 coupled to bus 602. Communication interface/s 618 provide two-way data communication over one or more physical or wireless network links 620 that are connected to a local network 622 and/or a wide area network (WAN), such as the Internet. For example, communication interface/s 618 may include an integrated services digital network (ISDN) card, cable modem, satellite modem, or a modem to provide a data communication connection to a corresponding type of telephone line. Alternatively and/or in addition, communication interface/s 618 may include one or more of: a local area network (LAN) device that provides a data communication connection to a compatible local network 622; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 628); and other networking devices that establish a communication channel between computer system 600 and one or more LANs 622 and/or WANs.

Network link/s 620 typically provides data communication through one or more networks to other data devices. For example, network link/s 620 may provide a connection through one or more local area networks 622 (LANs) to one or more host computers 624 or to data equipment operated by an Internet Service Provider (ISP) 626. ISP 626 in turn provides connectivity to one or more wide area networks 628, such as the Internet. LAN/s 622 and WAN/s 628 both use electrical, electromagnetic or optical signals that carry digital data streams. The signals through the various networks and the signals on network link/s 620 and through communication interface/s 618 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its main memory 606 and send the instructions over a telecommunications line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 can send messages and receive data, including program code, through the network(s), network link 620 and communication interface 618. In the Internet example, one or more servers 630 might transmit signals corresponding to data or instructions requested for an application program executed by the computer system 600 through the Internet 628, ISP 626, local network 622 and a communication interface 618. The received signals may include instructions and/or information for execution and/or processing by processor/s 604. Processor/s 604 may execute and/or process the instructions and/or information upon receiving the signals by accessing main memory 606, or at a later time by storing them and then accessing them from storage device/s 610.

Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
one or more hardware processors;
at least one memory coupled to the one or more hardware processors and storing one or more instructions which, when executed by the one or more hardware processors, cause the one or more hardware processors to:
partition, into a set of code blocks, key generation code that generates an expected key value when compiled and executed;
generate a shuffled set of code blocks by reordering the set of code blocks;
provide, for a client computing device, the shuffled set of code blocks and problem-solving code that, when executed at the client computing device, reconstructs the key generation code to generate a submission value by performing one or more compiling iterations, each compiling iteration comprising reordering the shuffled set of code blocks to generate test code, and attempting to compile and execute the test code to generate the submission value;
receive the submission value generated at the client computing device;
determine that the client computing device fully executed the problem-solving code based on the verifying the submission value; and in response to determining that the client computing device fully executed the problem-solving code, perform a positive action.

2. The computer system of claim 1, wherein performing the positive action comprises forwarding a request from the client computing device to a web server system.

3. The computer system of claim 1:
wherein the key generation code comprises JavaScript code;
wherein each compiling iteration comprises attempting to compile the test code in a JavaScript engine at the client computing device.

4. The computer system of claim 1, wherein each compiling iteration comprises attempting to compile the test code in a safe runtime environment.

5. The computer system of claim 1, wherein generating the shuffled set of code blocks comprises applying a permutation that is equivalent to applying a base permutation t times to the set of code blocks, where t is greater than 1.

6. The computer system of claim 5, wherein the one or more instructions, when executed by the one or more hardware processors, cause the one or more hardware processors to:
provide, for the client computing device, an inverse permutation that, when applied, is equivalent to undoing an effect of applying the base permutation one time;
wherein each compiling iteration comprises reordering the shuffled set of code blocks by applying the inverse ordering function one time to the shuffled set of code blocks.

7. The computer system of claim 5, wherein the one or more instructions, when executed by the one or more hardware processors, cause the one or more hardware processors to:
select a value for t to tune an expected amount of work performed by the client computing device to generate the key submission value.

8. The computer system of claim 1, wherein the one or more instructions, when executed by the one or more hardware processors, cause the one or more hardware processors to:
encrypt the expected key value to produce an encrypted key value using a server secret that is not known to the client computing device;
provide, for the client computing device, the encrypted key value;
receive the encrypted key value from the client computing device;
wherein verifying that the key submission value matches the expected key value comprises decrypting the encrypted key value using the server secret.

9. The computer system of claim 1, wherein the problem-solving code is provided in association with an application installed on the client computing device.

10. The computer system of claim 1, wherein partitioning the key generation code comprises inserting one or more context-ambiguous features into the key generation code and dividing the key generation code to generate the set of code blocks.

11. A method comprising:
partitioning, into a set of code blocks, key generation code that generates an expected key value when compiled and executed;
generating a shuffled set of code blocks by reordering the set of code blocks;
providing, for a client computing device, the shuffled set of code blocks and problem-solving code that, when executed at the client computing device, reconstructs the key generation code to generate a submission value by performing one or more compiling iterations, each compiling iteration comprising reordering the shuffled set of code blocks to generate test code, and attempting to compile and execute the test code to generate the submission value;
receiving the submission value generated at the client computing device;
determining that the client computing device fully executed the problem-solving code based on the verifying the submission value; and
in response to determining that the client computing device fully executed the problem-solving code, performing a positive action;
wherein the method is performed by one or more processors.

12. The method of claim 11, wherein performing the positive action comprises forwarding a request from the client computing device to a web server system.

13. The method of claim 11:
wherein the key generation code comprises JavaScript code;
wherein each compiling iteration comprises attempting to compile the test code in a JavaScript engine at the client computing device.

14. The method of claim 11, wherein each compiling iteration comprises attempting to compile the test code in a safe runtime environment.

15. The method of claim 11, wherein generating the shuffled set of code blocks comprises applying a permutation that is equivalent to applying a base permutation t times to the set of code blocks, where t is greater than 1.

16. The method of claim 15, further comprising:
providing, for the client computing device, an inverse permutation that, when applied, is equivalent to undoing an effect of applying the base permutation one time;
wherein each compiling iteration comprises reordering the shuffled set of code blocks by applying the inverse ordering function one time to the shuffled set of code blocks.

17. The method of claim 15, further comprising selecting a value for t to tune an expected amount of work performed by the client computing device to generate the key submission value.

18. The method of claim 11, further comprising:
encrypting the expected key value to produce an encrypted key value using a server secret that is not known to the client computing device;
providing, for the client computing device, the encrypted key value;
receiving the encrypted key value from the client computing device;
wherein verifying that the key submission value matches the expected key value comprises decrypting the encrypted key value using the server secret.

19. The method of claim 11, wherein the problem-solving code is provided in association with an application installed on the client computing device.

20. The method of claim 11, wherein partitioning the key generation code comprises inserting one or more context-ambiguous features into the key generation code and dividing the key generation code to generate the set of code blocks.

* * * * *